A. D. WILLOCK.
HARROW.
APPLICATION FILED JUNE 22, 1912.
1,064,038.
Patented June 10, 1913.
2 SHEETS—SHEET 2.
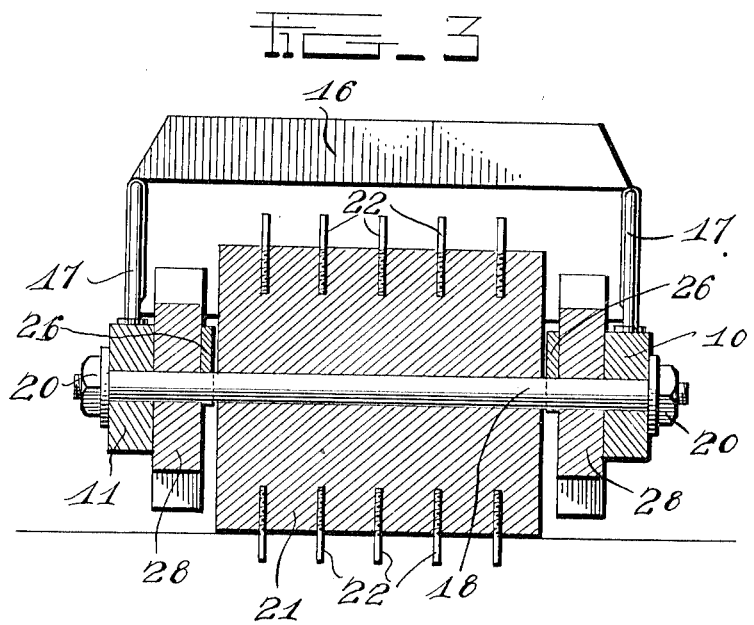
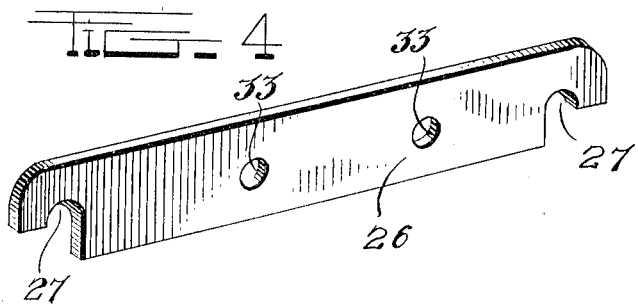
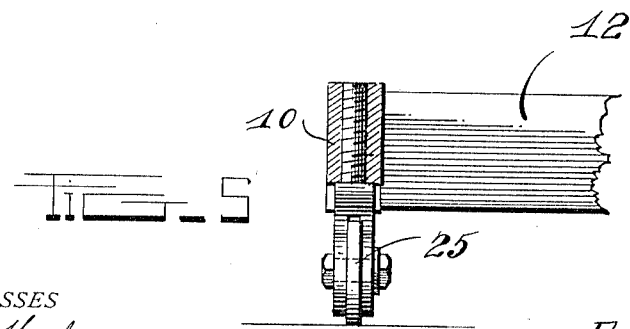
WITNESSES
INVENTOR
Andrew D. Willock
By ———, his Attorney.

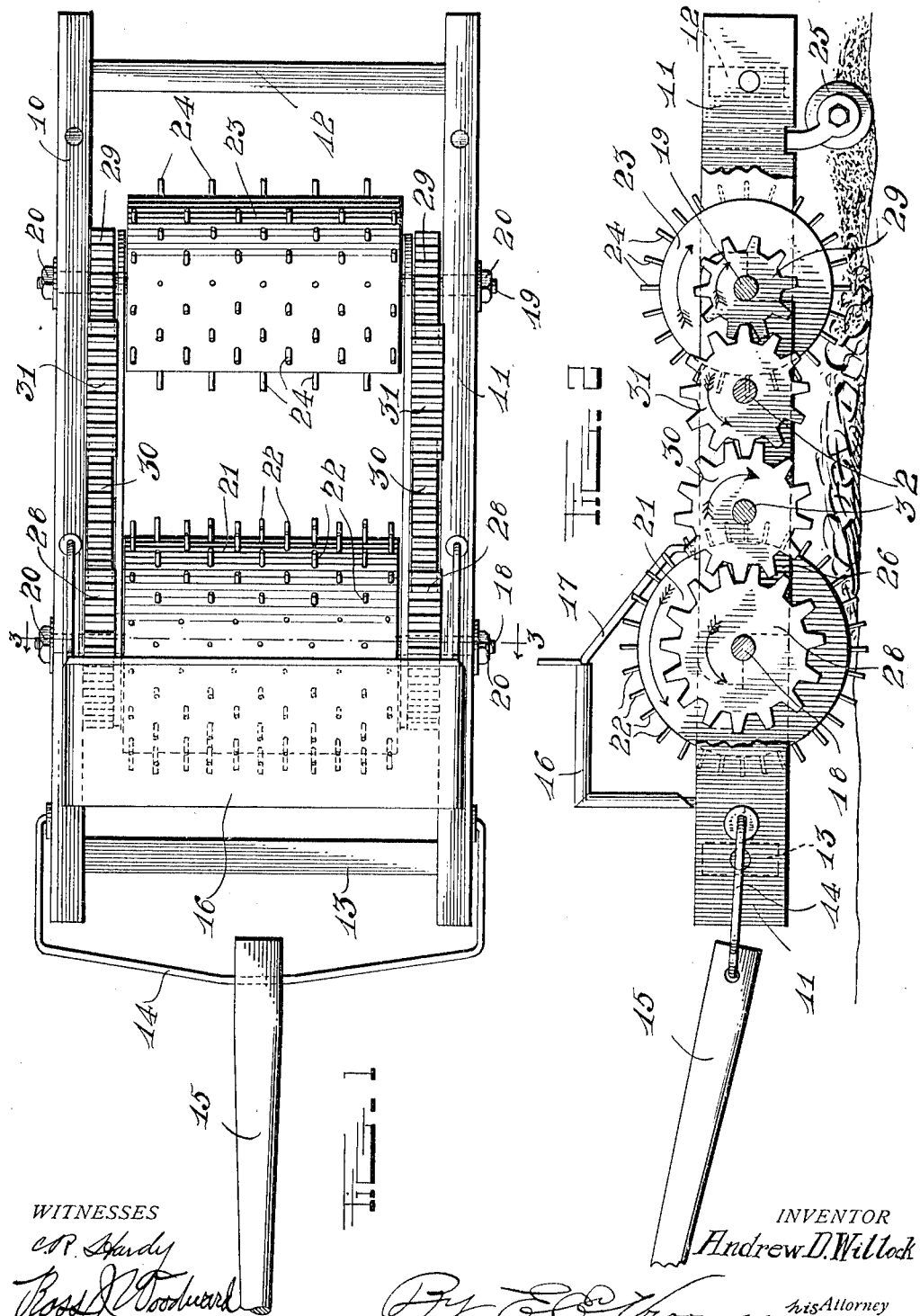

UNITED STATES PATENT OFFICE.

ANDREW D. WILLOCK, OF MASON CITY, ILLINOIS.

HARROW.

1,064,038.  Specification of Letters Patent.  Patented June 10, 1913.

Application filed June 22, 1912. Serial No. 705,275.

*To all whom it may concern:*

Be it known that I, ANDREW D. WILLOCK, citizen of the United States, residing at Mason City, in the county of Mason and State of Illinois, have invented certain new and useful Improvements in Harrows, of which the following is a specification, reference being had therein to the accompanying drawing.

This invention relates to rotary harrows, and the principal object of the invention is to provide an improved type of harrow which will very thoroughly cut up the plowed land, thus making a very fine seed bed.

Another object of the invention is to provide the harrow with cutting rollers which are so mounted that they will rotate in opposite directions, thus causing the ground to be better prepared.

Still another object of the invention is to provide the harrow with relatively large and small rollers which rotate at different speed, thus making the harrow operate very efficiently.

Still another object of the invention is to provide a harrow in which the front roller cuts deeper into the ground thus cutting the plowed land into relatively large pieces and a rear roller which acts upon the clots formed by the large forward roller and cuts them into smaller pieces.

This invention is illustrated in the accompanying drawings, wherein:—

Figure 1 is a top plan view of the improved harrow. Fig. 2 is a side elevation with the central portion of one of the side bars broken away. Fig. 3 is a transverse sectional view along the line 3—3 in Fig. 1. Fig. 4 is a perspective view of the bearing plate extending longitudinally of the harrow. Fig. 5 is a fragmentary view of the frame and shows one of the supporting casters in elevation.

Referring to the accompanying drawings, it will be seen that this invention comprises the frame having the side bars 10 and 11 and the cross bars 12 and 13 located adjacent the ends of the frame. A bracket 14, upon which the pole 15 is mounted, is connected with the side bars 10 and 11, thus connecting the pole with the frame. The driver's seat 16 is formed from sheet metal and has its side portions rolled about the supports 17 which are carried by the side bars. It should be noted that this seat also to a certain extent, acting as a brace for holding the side bars in the desired position.

Axles 18 and 19 are mounted between the side bars 10 and 11 and are held in place by means of the nuts 20, and form additional braces to prevent the side bars from spreading apart. A roller 21 is rigidly mounted upon the axle 18 and carries harrow teeth 22 which are adapted to cut up the plowed land. This roller is a relatively large roller, and is the roller which causes the remaining portions of the machine to operate when the harrow is in use. It should also be noted that this roller is located beneath the seat 16, so that when the driver is riding upon the harrow, the weight is placed directly above the roller thus causing the roller to sink deeper into the plowed land and make the roller operate better.

A smaller roller 23 is rigidly mounted upon the axle, 19, and carries harrow teeth 24 similar to the harrow teeth 22. This roller is considerably smaller than the roller 21 and when in use is suspended above the plowed land. It should be noted however, that after the plowed land has been cut up by the roller 21, that the level is raised and the clots thus placed at a sufficient height to be engaged by the teeth of the roller 23, so that they will be cut up into smaller lumps. Since the roller 23 does not support the weight of the frame, a pair of casters 25 has been provided so that the rear portion of the machine will be held level with the front portion, thus causing the harrow to work easily and also removing any weight at all from the roller 23.

Bearing plates 26 are mounted upon the axles 18 and 19, these bearing plates being positioned within the frame, and the axles resting in the notches 27. Relatively large and small cog wheels 28 and 29 are mounted upon the axles 18 and 19 respectively, between the bearing strips and the side bars and are connected by the gear wheels 30 and 31 which greatly increase in size from the gear wheel 27 to the wheel 28. These gear wheels 30 and 31 are provided with axles 32 which are mounted between the side bars 10 and 11, and the bearing strips 26, the inner ends of the axles 32 being mounted in the openings 33 of the strips 26. From an inspection of Fig. 2, it will be seen that when the roller 21 is rotated rotary motion is transmitted through the gears 28, 29, 30, and 31, to the roller 23, thus causing the roller to be rotated in an opposite direction from the roller 21 and it will also be noted that the roller 23 is rotated a great deal faster than the roller 21.

When this device is in use, animals are connected with the pole and the harrow is drawn across the plowed land. As the harrow moves across the plowed land, the soil which has been turned by the plow is cut up by the roller 21 into rather large clots. It will be noted that since the principal part of the weight of this machine comes upon the roller 21, the teeth of the roller dig deep into the ground thus cutting the soil for a considerable depth. It is desired to have this roller turned rather slowly since the soil which is to be cut is heavy and, therefore, if the roller turned too quickly, the teeth of the roller might very readily become bent. After the roller 21 has cut up the plowed land into large clots, the roller 23 next engages these clots, and since this roller rotates very rapidly the clots will be cut up into very small particles thus leaving a very fine seed bed after the harrow has passed over the land. It should also be noted that since the roller 23 rotates in an opposite direction to that of the roller 21, there is no danger of the clots cut by the roller 21 being thrown back of the harrow without being cut by the roller 23, since the roller 23 will catch any of the clots thus thrown, and cut them into pieces. It should also be noted that by having the roller 23 turned in a direction indicated by the arrows, there is no danger of any pieces of dirt which may have dried out and become rather hard, being thrown back of the harrow since these will be thrown toward the roller 21 and will be cut up when the roller again reaches them.

It will thus be seen that there has been provided a harrow which is very efficient in use when land is cut into large clots by the forward roller and these clots cut up into fine pieces by the rear roller.

Having thus described my invention, what I claim is new is:—

1. In a harrow, a frame, axles carried by said frame, cutting rollers mounted upon said axles, gear wheels mounted upon said axles, bearing strips mounted upon said axles, and other gear wheels mounted between the sides of said frame and said bearing strips, and connecting said first mentioned gear wheels whereby rotation of one of said rollers will transmit rotary motion to the other of said rollers.

2. A harrow comprising a frame having side bars, axles carried by said side bars and passing transversely through said frame, cutting rollers rigidly mounted upon said axles, gear wheels rigidly mounted upon said axles, bearing strips connected with said axles and having their ends positioned between said rollers and said gear wheels and provided with cut-out portions in which said axles fit, and other gear wheels rotatably mounted between said bearing strips and said side bars and meshing with the first mentioned gear wheels.

In testimony whereof I hereunto affix my signature in presence of two witnesses.

ANDREW D. WILLOCK.

Witnesses:
 LOUIS C. WINZLER,
 W. A. COONY.